US009135299B2

(12) United States Patent
Burger

(10) Patent No.: US 9,135,299 B2
(45) Date of Patent: Sep. 15, 2015

(54) SYSTEM, METHOD, AND COMPUTER-READABLE MEDIUM FOR AUTOMATIC INDEX CREATION TO IMPROVE THE PERFORMANCE OF FREQUENTLY EXECUTED QUERIES IN A DATABASE SYSTEM

(75) Inventor: Louis Burger, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 841 days.

(21) Appl. No.: 12/551,601

(22) Filed: Sep. 1, 2009

(65) Prior Publication Data

US 2011/0055201 A1    Mar. 3, 2011

(51) Int. Cl.
G06F 7/00 (2006.01)
G06F 17/30 (2006.01)

(52) U.S. Cl.
CPC .... *G06F 17/30442* (2013.01); *G06F 17/30424* (2013.01)

(58) Field of Classification Search
None
See application file for complete search history.

(56) References Cited

U.S. PATENT DOCUMENTS

| | | | | |
|---|---|---|---|---|
| 5,812,996 | A * | 9/1998 | Rubin et al. | 1/1 |
| 6,266,658 | B1 * | 7/2001 | Adya et al. | 1/1 |
| 7,890,497 | B2 * | 2/2011 | Folkert et al. | 707/718 |
| 2003/0093408 | A1 * | 5/2003 | Brown et al. | 707/2 |
| 2005/0203940 | A1 * | 9/2005 | Farrar et al. | 707/102 |
| 2005/0240624 | A1 * | 10/2005 | Ge et al. | 707/104.1 |
| 2008/0222087 | A1 * | 9/2008 | Balmin et al. | 707/2 |
| 2008/0288524 | A1 * | 11/2008 | Dumitru et al. | 707/102 |
| 2009/0030874 | A1 * | 1/2009 | Das et al. | 707/2 |
| 2009/0106321 | A1 * | 4/2009 | Das et al. | 707/200 |
| 2009/0254522 | A1 * | 10/2009 | Chaudhuri et al. | 707/3 |
| 2010/0198811 | A1 * | 8/2010 | Wiener et al. | 707/718 |

\* cited by examiner

*Primary Examiner* — Loan T Nguyen
(74) *Attorney, Agent, or Firm* — Steven McDonald; Ramin Mahboubian

(57) ABSTRACT

A system, method, and computer-readable medium that facilitate the optimization of frequently executed queries via automated index creation are provided. Standard optimizer strategies for dynamic index creation are utilized with query frequency information taken from a system's request cache. The described mechanisms provide a process of determining what indexes would be beneficial to query performance based on decisions and information from the optimizer that is ultimately responsible for the choice of index usage. Further, the plan cache is utilized in a manner that provides reliable information about the historical and anticipated frequency of specific queries.

18 Claims, 6 Drawing Sheets

Employee

| | 520a Employee_No | 520b SS_Num | 520c Salary |
|---|---|---|---|
| 510a | 56789 | 111-11-1111 | 55000 |
| 510b | 12345 | 222-22-2222 | 65000 |
| 510c | 23232 | 333-33-3333 | 65000 |
| 510d | 34343 | 444-44-4444 | 70000 |
| 510e | 45454 | 555-55-5555 | 90000 |
| 510f | 56565 | 666-66-6666 | 85000 |
| 510g | 67676 | 777-77-7777 | 105000 |
| 510h | 78787 | 888-88-8888 | 60000 |
| 510i | 89898 | 999-99-9999 | 35000 |

Figure 5

SYSTEM, METHOD, AND COMPUTER-READABLE MEDIUM FOR AUTOMATIC INDEX CREATION TO IMPROVE THE PERFORMANCE OF FREQUENTLY EXECUTED QUERIES IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, CPU processing, I/O processing, network processing, etc., as determined by an optimizer. The response time is the amount of time it takes to complete the execution of a query on a given system.

A database index comprises a data structure that improves the speed of operations on a database table. Indexes may be created using one or more columns of a database table, providing the basis for both rapid random look ups and efficient access of ordered records. Some SQL query optimizers will consider dynamically creating an index as part of the processing strategy for an expensive retrieve or join operation where no applicable index is found. In such cases, the index is created prior to the retrieve or join operation being performed, and then dropped immediately after its use in the current request. In practice, the use of such an optimization strategy is rare because the overhead cost of creating the index typically outweighs the resulting cost improvements to the retrieve or join operation.

In the case of a frequently executed query, although the performance of a single instance may not be improved, the cumulative performance over a period of time may be dramatically improved if the index is retained and the overhead of creating the index is amortized over many query instances. Unfortunately, the costing context of all known commercial optimizers is limited to a single SQL request which prevents them from factoring in a query's actual or expected frequency over a period of time. Many vendors do provide index tuning tools that will examine a set of queries (along with their frequencies) and automatically recommend indexes. However, such tools operate only when invoked, are noted for being very resource intensive, and are not active during regular query processing.

Therefore, what is needed is a mechanism that overcomes the described problems and limitations.

SUMMARY

Disclosed embodiments provide a system, method, and computer readable medium that facilitate the optimization of frequently executed queries via automated index creation. Standard optimizer strategies for dynamic index creation are utilized with query frequency information taken from a system's request cache. The described mechanisms provide a process of determining what indexes would be beneficial to query performance based on decisions and information from the optimizer that is ultimately responsible for the choice of index usage. Further, the plan cache is utilized in a manner that provides reliable information about the historical and anticipated frequency of specific queries.

BRIEF DESCRIPTION OF THE DRAWINGS

Aspects of the present disclosure are best understood from the following detailed description when read with the accompanying figures, in which:

FIG. 5 is a diagrammatic representation of a portion of an exemplary table on which automated index creation mechanisms for frequently executed queries may be implemented in accordance with disclosed embodiments;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, database system mechanisms provide for optimization of frequently executed queries by way of automatic index creation.

Figure 1:
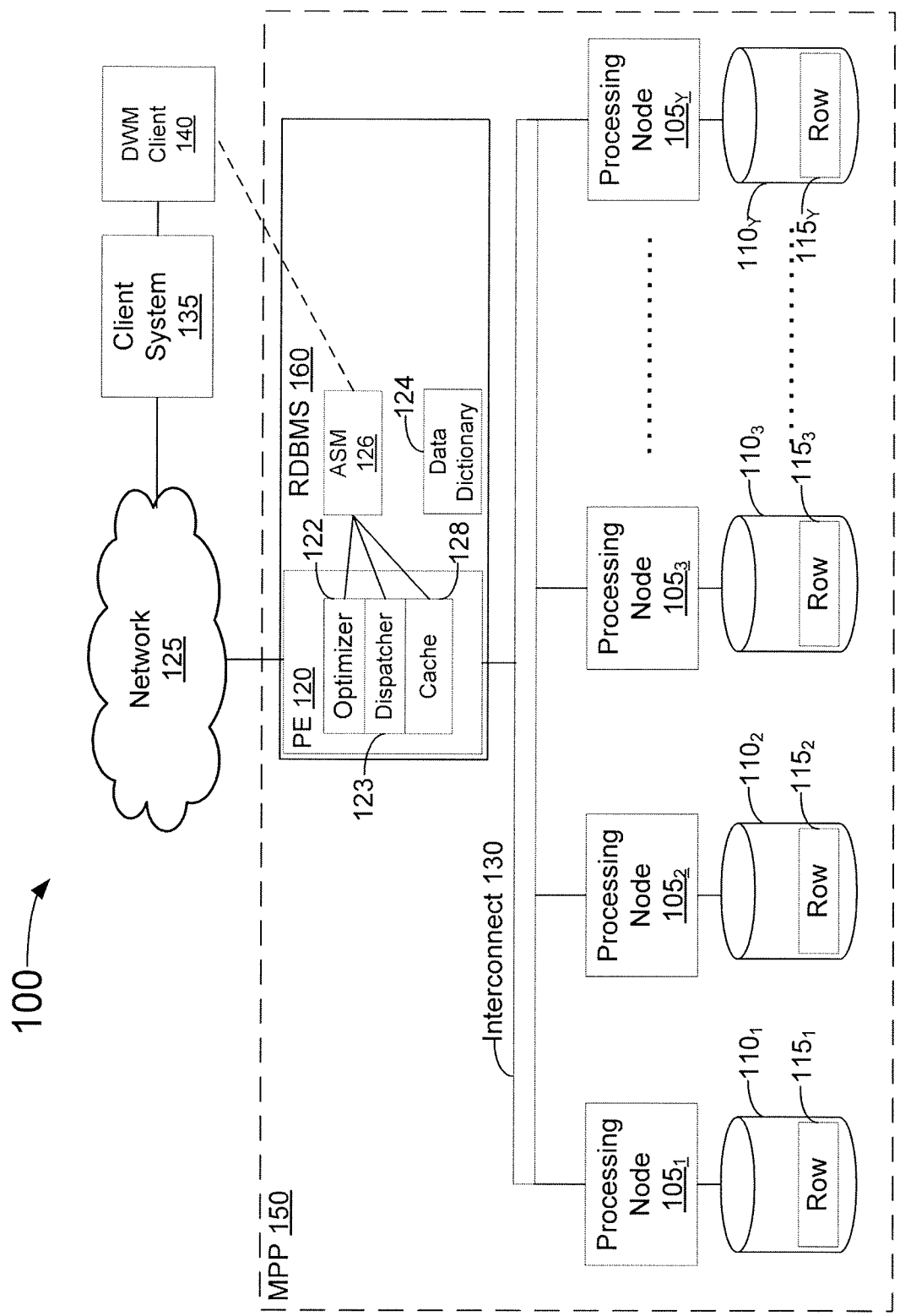
FIG. 1 depicts a diagrammatic representation of an exemplary architecture for a large database system that is suited for implementing mechanisms for automated index creation to improve the performance of frequently executed queries in accordance with disclosed embodiments.

FIG. 1 depicts a diagrammatic representation of an exemplary architecture for a large database system 100, such as a Teradata Active Data Warehousing System, that is suited for implementing mechanisms for automated index creation to improve the performance of frequently executed queries in accordance with disclosed embodiments.

The database system 100 includes a relational database management system (RDBMS) 160 built upon a massively parallel processing (MPP) system 150. As shown, the database system 100 includes one or more processing nodes $105_1 \ldots Y$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1...Y}$. The rows $115_{1...Y}$ of the tables are stored across multiple data-storage facilities $110_{1...Y}$ to ensure that the system workload is distributed evenly across the processing nodes $105_{1...Y}$. A parsing engine 120 organizes the storage of data and the distribution of table rows $115_{1...Y}$ among the processing nodes $105_{1...Y}$ and accesses processing nodes $105_{1...Y}$ via an interconnect 130. The parsing engine 120 also coordinates the retrieval of data from the data-storage facilities $110_{1...Y}$ in response to queries received from a user, such as one at a client computer system 135 connected to the database system 100 through a network 125 connection. The client computer system 135 may run a dynamic workload manager (DWM) client 140. The parsing engine 120, on receiving an incoming database query, interfaces with an optimizer 122 and an active system management (ASM) 126 module. The optimizer 122 component is invoked to assess the best plan for execution of the query. As is understood, a query plan, also referred to as a query execution plan, comprises a set of steps used to access or modify information in a SQL relational database management system. Because SQL is declarative, there are typically a large number of alternative ways—corresponding to different query plans—to execute a given query, and many of the query plans may exhibit widely varying performance. When a query is submitted to the database system, the optimizer may evaluate some of the different query plans for executing the query and may select what the optimizer determines the best query plan, e.g., based on a query plan cost analysis. Selecting the optimal query-execution plan includes, among other things, identifying which of the processing nodes $105_{1...Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The ASM 126 may be implemented as a "closed-loop" system management (CLSM) architecture capable of satisfying a set of workload-specific goals. In other words, the system is a goal-oriented workload management system capable of supporting complex workloads and capable of self-adjusting to various types of workloads. The ASM 126 is communicatively interfaced with a dispatcher 123 to receive query execution plan costs therefrom. The DWM client 140 is communicatively interfaced with the ASM 126. The ASM 126 further interfaces with a query plan cache 128 that stores query plans identified as the most cost-effective query plan for various queries.

The ASM 126 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance.

Figure 2:
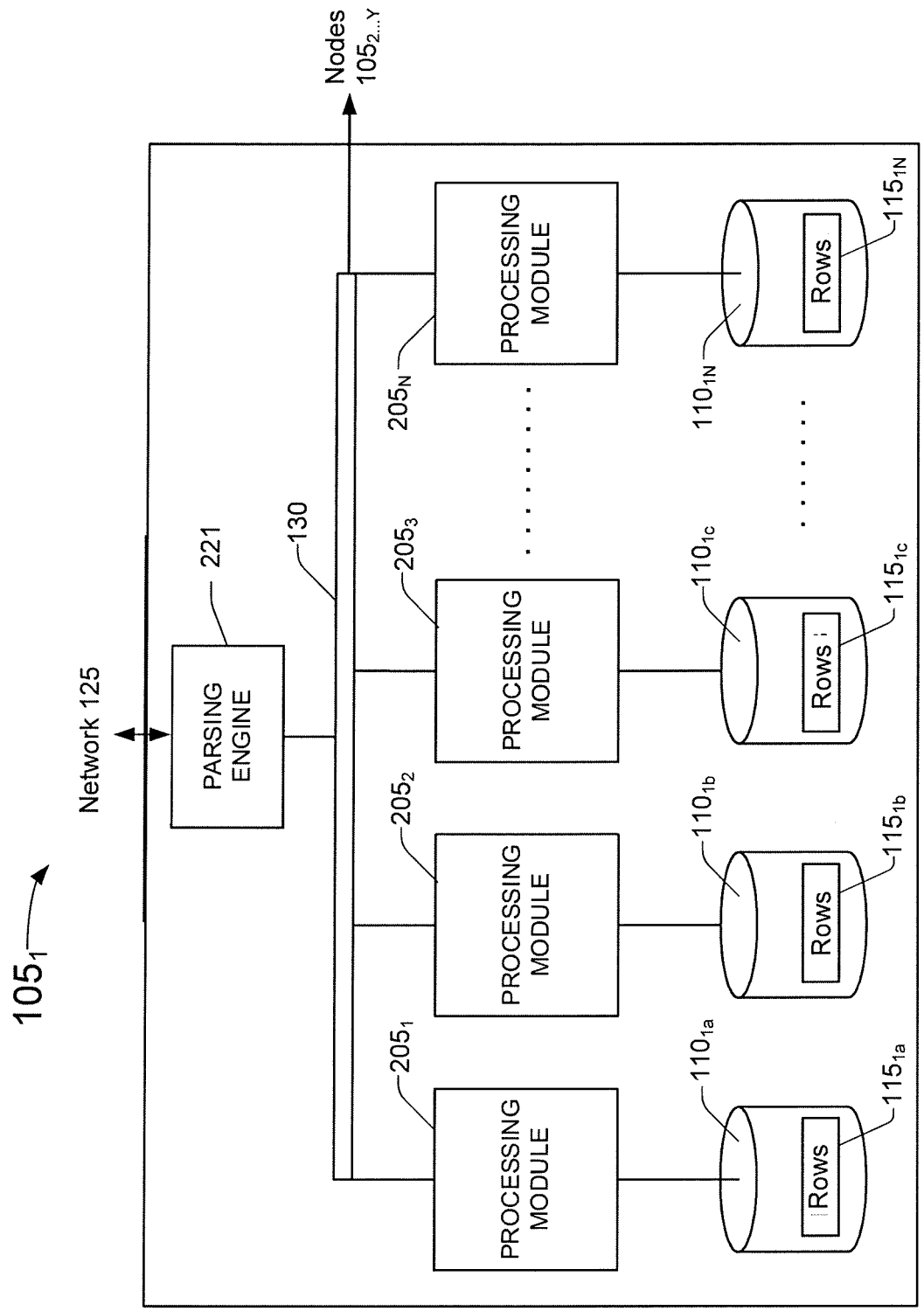
FIG. 2 depicts a diagrammatic representation of a sample architecture for one node of the database system depicted in FIG. 1 implemented in accordance with disclosed embodiments.

FIG. 2 depicts a diagrammatic representation of a sample architecture for one node $105_1$ of the DBS 100. The DBS node $105_1$ includes one or more processing modules $205_{1...N}$, e.g., AMPs, connected by an interconnect 130 that manage the storage and retrieval of data in data-storage facilities $110_{1a...1N}$. The processing module $205_{1...N}$ and the dispatcher 123 depicted in FIG. 1 are collectively referred to herein as a runtime query execution system. Each of the processing modules $205_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1...N}$ manages a portion of a database that is stored in a corresponding one of the data-storage facilities $110_{1a...1N}$. Each of the data-storage facilities $110_{1a...1N}$ includes one or more disk drives. The DBS may include multiple nodes $105_{2...Y}$ in addition to the illustrated node $105_1$, connected by way of the interconnect 130.

The system stores data in one or more tables in the data-storage facilities $110_{1a...1N}$. The rows $115_{1a...1N}$ of the tables are stored across multiple data-storage facilities $110_{1a...1N}$ to ensure that the system workload is distributed evenly across the processing modules $205_{1...N}$. A parsing engine 221 organizes the storage of data and the distribution of table rows $110_{1a...1N}$ among the processing modules $205_{1...N}$. The parsing engine 221 also coordinates the retrieval of data from the data-storage facilities $110_{1a...1N}$ in response to queries received from a user at a client computer system 135. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
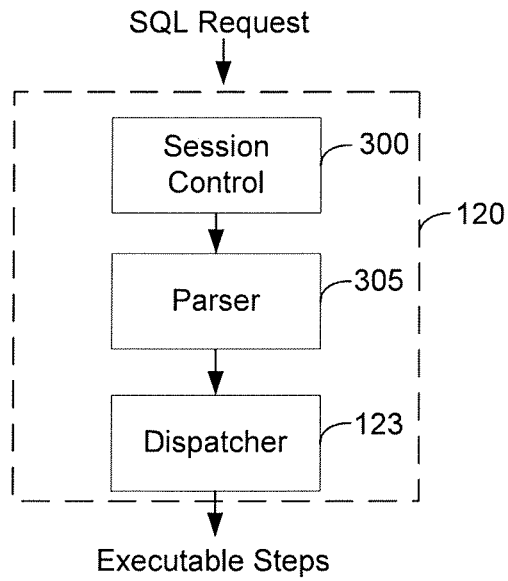
FIG. 3 is a diagrammatic representation of a parsing engine implemented in accordance with an embodiment.
Figure 4:
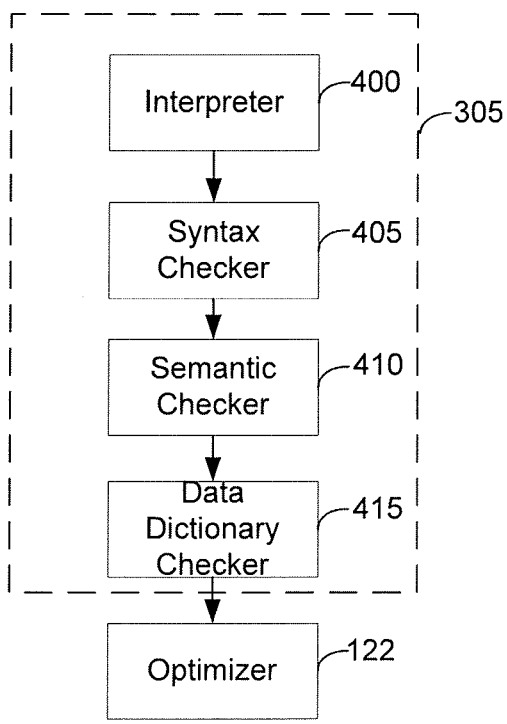
FIG. 4 is a diagrammatic representation of a parser implemented in accordance with an embodiment.

In one example system, a parsing engine, such as the parsing engine 120, is made up of three components: a session control 300, a parser 305, and a dispatcher 123 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). The optimizer 122 is then invoked and selects the least expensive plan to perform the request, and a dispatcher 123 coordinates the runtime execution of executable steps of the optimizer's 122 query execution plan with the processing modules $205_1$-$205_N$.

A physical storage structure that is provided by some database management systems is an index. An index is a structure that provides relatively rapid access to the rows of a table based on the values of one or more columns. An index stores data values and pointers to the rows where those data values occur. An index can be arranged in ascending or descending order, so that the database management system can quickly search the index to find a particular value. The database management system can then follow the pointer to locate the row containing the value.

The advantage of having an index is that it speeds the execution of SQL statements with search conditions that refer to an indexed column or columns. Generally, it is desired to create an index for columns that are used frequently in search conditions (such as in the Where clause of a SELECT statement).

In the exemplary database system 100, a primary index is defined for each table, and one or more secondary indexes are optionally defined for each table. In a database system having multiple access modules, such as AMPs, the primary index is used for assigning a data row to a particular one of plural AMPs. In effect, the primary index determines the distribution of rows of a table across multiple AMPs of the database system.

As noted above, one or more secondary indexes can also be specified for each table. Secondary indexes are stored in sub-tables of the database system. A "sub-table" is also a relational table. The secondary index does not affect distribution of a table across multiple AMPs. However, the secondary index does add to overhead, since the secondary index is stored in sub-tables. Despite the extra storage required, secondary indexes, if properly used, can enhance database performance.

FIG. 5 is a diagrammatic representation of a portion of an exemplary table 500 on which automated index creation mechanisms for frequently executed queries may be implemented in accordance with disclosed embodiments.

Table 500 comprises a plurality of records 510a-510i (collectively referred to as records 510) and fields 520a-520c (collectively referred to as fields 520). Each record 510 comprises data elements in respective fields, or attributes, 520. In the present example, table 500 has a table name "Employee" and includes fields 520 having respective labels of "Employee_No", "SS_Num", and "Salary".

In accordance with disclosed embodiments, mechanisms are provided that facilitate the optimization of frequently executed queries via automated index creation. Standard optimizer strategies for dynamic index creation are utilized with query frequency information taken from a system's request (e.g., query plan) cache 128. The described mechanisms provide a process of determining what indexes would be beneficial to query performance based on decisions and information from the optimizer that is ultimately responsible for the choice of index usage. Further, the plan cache 128 is utilized that provides reliable information about the historical and anticipated frequency of specific queries.

In an embodiment, a user may define an ASM rule designed to enable and control the automatic creation of indexes on a list of specified tables based on the observed frequency of individual queries whose optimized plans contain information regarding potential dynamic index creation. During the normal course of optimizing a query, when the optimizer considers a desirable plan involving dynamic index creation but subsequently rejects the plan in favor of another, lower cost, plan, a requisite "Amortized Frequency" and index definition are recorded within the saved plan information. This saved information represents an index strategy that would have been part of an optimal/chosen plan had the index already existed before the query was executed.

More specifically, if the cost of the plan involving dynamic index creation minus the index creation cost is cheaper than the chosen best plan, there exists a potential savings per instance of the query if the index were statically created once up front. A break even point occurs when the cumulative query savings (based on query frequency) outweighs the cost of having to create the index once. For example, a per query saving may be computed according to the following:

$$PerQuerySavings = Chosen\_Plan\_Cost - (Dynamic\_Plan\_Cost - Index\_Creation\_Cost) \qquad \text{eq. 1}$$

If the per query savings (PerQuerySavings) is greater than zero, the amortized frequency may be calculated according to the following:

$$Amortized\ Frequency = ceiling(Index\_Creation\_Cost / PerQuerySavings); \qquad \text{eq. 2}$$

where the ceiling(x) returns the smallest integer not less than x. The amortized frequency specifies a parametric value at which a query plan may be more efficiently executed in correspondence with creation of an index.

When a query's already optimized plan is fetched from the request cache 128 for execution, a frequency counter (maintained as part of the cache subsystem) is incremented. This counter is reset to zero when a plan is removed from cache.

The ASM subsystem monitors plans in the request cache that may be marked with a flag that indicates the plan may be a suitable candidate plan for execution if an index were created to facilitate execution of the plan and compares the actual frequency counter with the amortized frequency. Under the assumption that a query's observed frequency is a good predictor of its future frequency, the ASM will consider creating an index once the frequency counter reaches the required amortized frequency.

For those plans whose execution frequencies reach the requisite amortized frequency, the ASM retrieves the dynamic index definition stored in association with the cached plan. If an ASM rule has been defined enabling automatic index creation on the table, the ASM generates the corresponding SQL CREATE INDEX statement and issues it to the database system. After the index creation is complete, the ASM communicates with the request cache subsystem to mark the plan stored in the request cache as "dirty" which in turn causes it to be spoiled/removed from the cache.

When the query in question is executed again, it will be freshly parsed and optimized. With the availability of the newly created index, the optimizer will choose to use it except in those few cases where other important conditions (e.g., statistics) have also changed.

The ASM rule specified by a user to enable and control the automatic creation of indexes allows users to control the conditions for automatically dropping indexes that are automatically created when the query frequency reaches the amortized frequency. In particular, the user may specify whether such indexes should be dropped prior to the execution of any identified bulk loads or large updates on the indexed table. Once dropped, the index will only be recreated by the ASM if the previously mentioned conditions repeat themselves.

Figure 6:
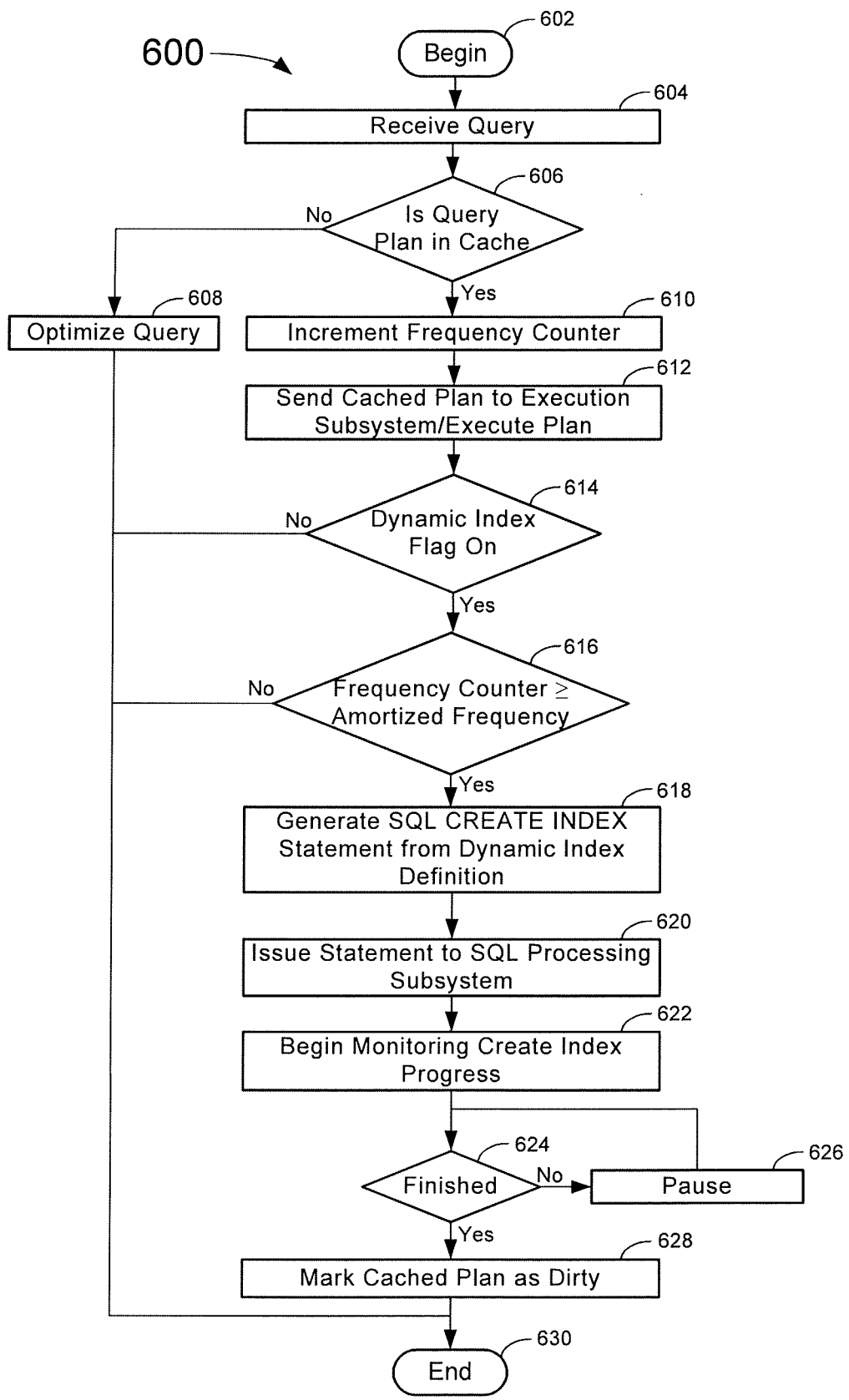
FIG. 6 is a flowchart that depicts processing of a cached plan execution routine that facilitates improved processing of frequently executed queries implemented in accordance with an embodiment.

FIG. 6 is a flowchart 600 that depicts processing of a cached plan execution routine that facilitates improved processing of frequently executed queries implemented in accordance with an embodiment. The processing steps of FIG. 6 may be implemented as computer-executable instructions tangibly embodied on a computer-readable medium executable by a processing system, such as one or more of the processing nodes $105_1$-$105_Y$ depicted in FIG. 1.

The routine is invoked (step 602), and a query is received for processing (step 604). An evaluation may then be made to determine if a query plan corresponding to the received query is located in the query plan cache 128 (step 606). If no query plan corresponding to the received query is currently cached, the routine may then proceed to optimize the query (step 608) as described more fully hereinbelow with reference to FIG. 7, and the execution routine cycle may then end (step 630).

Returning again to step 606, in the event a query plan is currently cached, a frequency counter assigned to the received query is incremented (step 610), and the cached query plan is then transmitted to the execution subsystem and executed thereby (step 612). An evaluation may then be made to determine if a dynamic index flag is set or otherwise asserted (step 614). As described more fully hereinbelow, the dynamic index flag is asserted in the event that a first query plan is selected for execution over a second query plan where the second query plan is evaluated as potentially more efficient if an index were established for use during execution of the second query plan. If not, the execution routine cycle may then end according to step 630. If the dynamic index flag is set, an evaluation may then be made to determine if the frequency counter is greater or equal to the amortized frequency (calculated, for example, according to equation 2 described above) for the submitted query (step 616). If not, the execution routine cycle may then end according to step 630.

If the frequency counter is evaluated as greater or equal to the amortized frequency of the submitted query at step 616, an SQL index creation statement may be generated from a dynamic index definition associated with the query and currently stored in the cache 128 (step 618). The SQL create index statement may then be issued to the SQL processing subsystem (step 620). Monitoring of the index creation progress may then be performed (step 622), and an evaluation may be periodically made to determine if the index creation has completed (step 624). If not, the monitoring process may pause (step 626), e.g., for a pre-defined period of time, and an evaluation may again be made to determine if the index creation has completed according to step 624.

When it is determined at step 624 that the index has been created, the currently cached query plan may then marked as "dirty" or otherwise designated as obsolete (step 628) along with any dynamic index flag. That is, the cached query plan executed at step 612 may be deleted or otherwise ignored for future consideration regarding the current query. The cached plan execution routine cycle may then end (step 630).

Figure 7:
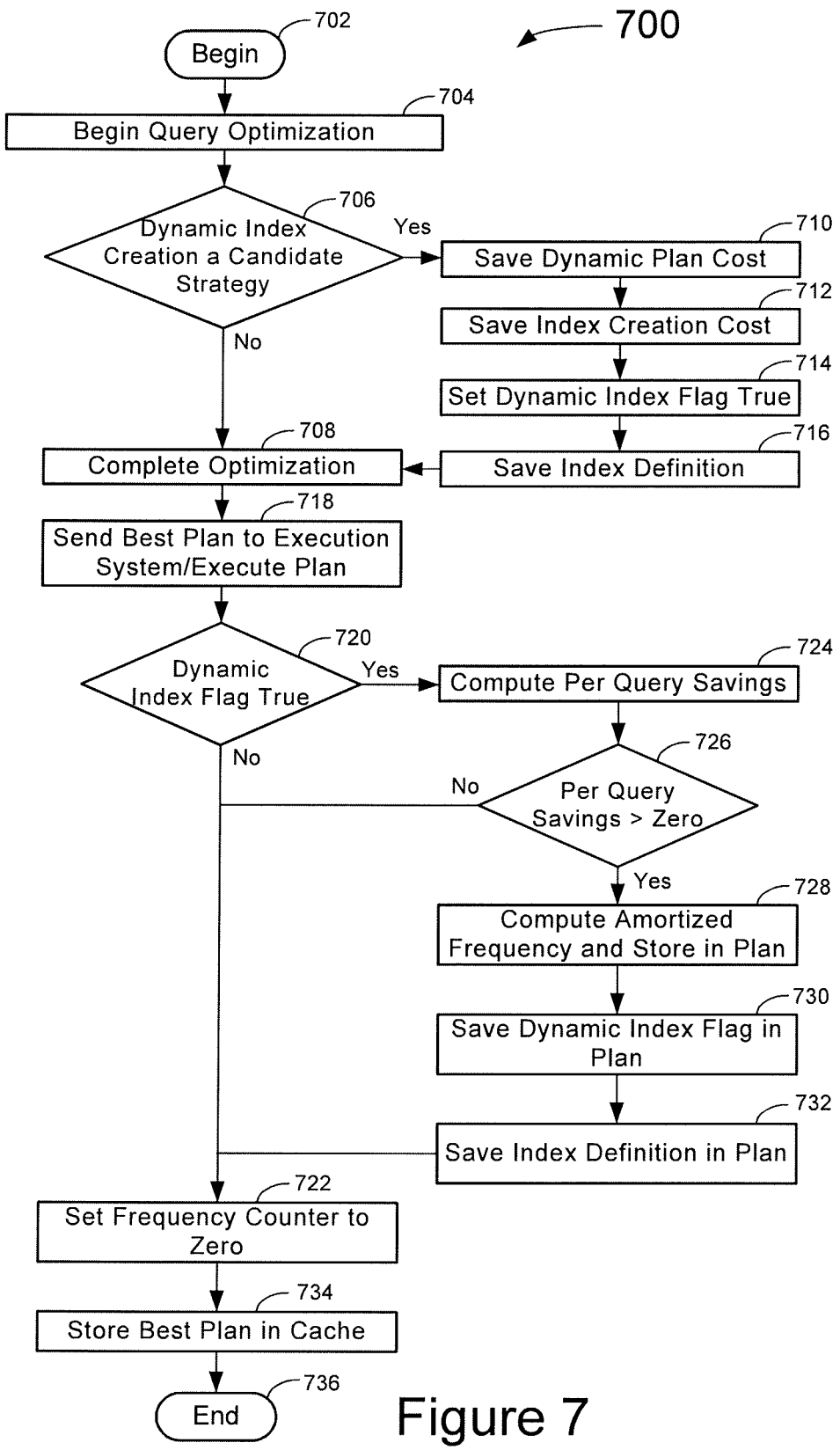
FIG. 7 is a flowchart that depicts processing of a query optimization routine that facilitates improved processing of frequently executed queries implemented in accordance with an embodiment.

FIG. 7 is a flowchart 700 that depicts processing of a query optimization routine that facilitates improved processing of frequently executed queries implemented in accordance with an embodiment. The processing steps of FIG. 7 may be implemented as computer-executable instructions tangibly embodied on a computer-readable medium executable by a processing system, such as one or more of the processing nodes $105_1$-$105_Y$ depicted in FIG. 1.

The query optimization routine is invoked (step 702), e.g., in response to execution of step 608 described above with reference to FIG. 6, and the query optimization routine then begins (step 704). The query optimization may generally result in the generation of various query plans and the calculation of a respective estimated cost, e.g., processing time, for each of the query plans. An evaluation may then be made to determine if dynamic index creation is a candidate strategy for the query being processed (step 706). That is, the dynamic index creation evaluation of step 706 evaluates whether a first plan was selected over a second plan due to a lower cost of the first plan, and, if so, whether the second plan has been evaluated as potentially presenting a lower cost than the first plan if an index were created that would be utilized by the second plan. If not, query optimization is then completed according to conventional mechanisms (step 708), and the best, e.g., lowest cost plan, may then be sent to the execution system and executed thereby (step 718).

Returning again to step 706, in the event the dynamic index creation is a candidate strategy, the optimization routine may then save the dynamic plan cost (step 710) along with the index creation cost (step 712). The dynamic plan cost comprises an estimated processing cost, e.g., processing duration, of the corresponding query plan, and the index creation cost comprises an estimated processing cost, e.g., a processing duration that would be consumed for generating the corresponding index. Further, a dynamic index flag may then be set to true or otherwise asserted (step 714) that indicates a corresponding query plan may be more desirable to execute if an index is generated that facilitates execution of the query plan. An index definition may then be saved (step 716). The optimization process may then complete according to step 708.

After completion of the optimization process, the query plan evaluated as the best plan is then sent to the execution system and is executed thereby (step 718). An evaluation may then be made to determine if the dynamic index flag is set to true or otherwise asserted (step 720). If the dynamic index flag is not set to true, the optimization routine may then proceed to set the frequency counter to zero (step 722). In the event the dynamic index flag is set to true, a per query savings metric is then calculated (step 724), e.g., according to equation 1, and an evaluation may then be made to determine if the calculated per query savings is greater than zero (step 726). If not, the optimization routine may then proceed to set the frequency counter to zero according to step 722. If the per query savings value is evaluated as greater than zero at step 726, the optimization routine may then proceed to compute an amortized frequency value, e.g., according to equation 2, and store the calculated amortized frequency with the query plan information (step 728). Further, the optimization routine may save the dynamic index flag in association with the query plan information (step 730). The index definition may also be saved in association with the query plan information (step 732). The frequency counter may then be set to zero according to step 722.

After the frequency counter is set to zero, the best plan, e.g., the query plan identified as having the lowest cost that was executed at step 718, may then be cached (step 734), and the optimization routine cycle may then end (step 736).

As an example, consider the following SQL query to be executed on the Employee table depicted in FIG. 5:

SELECT*FROM EMPLOYEE WHERE Salary>80000;

Assume that on receipt of the query, no query plan corresponding to the received query is cached. Accordingly, the cached plan execution routine described with reference to FIG. 6 then invokes the query optimization routine according to step 608. Various query plans may then be generated by the optimization routine according to step 704, and an evaluation is then made at step 706 to determine if a first query plan was selected over a second query plan that has been identified as potentially having a lower processing cost than the first query plan if an index were created for use by the second plan. In the illustrative example, assume a first plan is identified as having a lower cost than a second plan, but the second plan is evaluated as potentially having a lower cost if an index were created for the salary predicate of the query that would be utilized by the second query plan. In this instance, a dynamic plan cost and the index creation cost are calculated and saved along with the index definition according to steps 710-712 and 716. The dynamic plan cost comprises an estimated cost, e.g., processing duration, of the second plan that requires the index for execution. Further, a dynamic index flag is set to true per step 714. The dynamic index flag provides an indication that a first query plan has been selected for execution over a second query plan that has been identified as having a potentially lower cost that the plan selected for execution if an index were created. Thereafter, the optimization process is completed, and the first query plan that was selected over the second query plan is then executed according to step 718.

An evaluation is then made to determine if the dynamic index flag has been set. In the present example, the dynamic index flag was set at step 714, and thus the optimization routine then computes a per query savings value, e.g., as described above with reference to equation 1, according to step 724. The per query savings value is then evaluated to determine if it is greater than zero according to step 726. For illustrative purposes, assume the per query savings value is greater than zero thereby indicating that the second plan would provide a processing cost savings over the first query plan if the index for the second query plan was created. Accordingly, the amortized frequency is then calculated, e.g., as described above with reference to equation 2, and stored according to step 728. The dynamic index flag is then saved in association with the plan and the index definition is saved therewith according to steps 730-732. The frequency counter is then set to zero and the best plan is then cached—the first query plan in the present example that was executed at step 718—according to steps 722 and 734.

On a subsequent receipt of a query corresponding to the exemplary query, the evaluation of the query plan cache at step 606 results in a determination that a query plan is currently cached—the first query plan in the present example. The frequency counter is then incremented, and the cached first plan is then sent for execution according to steps 610 and 612. The dynamic index flag has been previously set, and thus an evaluation is then made to determine if the frequency counter equals or exceeds the amortized frequency according to step 616. For illustrative purposes, assume the frequency counter exceeds the amortized frequency. In this instance, the index for the second query plan is then generated according to steps 618-626, and the first query plan that was executed according to step 612 is then marked as dirty or otherwise deleted from the cache according to step 628. Further, any dynamic index flag that has been set and saved is removed along with the cached plan.

On receipt of another query compliant with the exemplary query, the cached plan execution routine will determine that no query plan is currently cached at step 606, and the optimization routine will then be invoked according to step 608. The optimization routine will then generate various query plans according to step 704. In this instance, a query plan compliant or similar to the above referenced second query plan will be selected over the previously executed first query plan due to the index required for execution of the second plan having previously been generated according to step 618-626. In this instance, the generated "second query" plan may be technically distinguished from the second query plan previously considered with dynamic index creation because the second query plan now does not rely on a dynamic index creation but, rather, utilizes the index that has previously been created. Thus, the optimization routine will not identify any query plan for selection over another query plan that would otherwise have a lower cost if an index were created for the non-selected plan at step 706. In this instance, the optimization is completed at step 708, and the second query plan is then executed utilizing the previously created index according to step 718. The dynamic index flag is then evaluated as non-asserted at step 720, and the second query plan is then stored in cache according to step 734. On receipt of another query compliant with the exemplary query, the second query plan that is now stored in cache is then executed according to step 612. The cached plan execution routine will then evaluate the dynamic index flag as non-asserted at step 614, and the execution routine cycle will then end according to step 630.

The flowcharts of FIGS. 6-7 depict process serialization to facilitate an understanding of disclosed embodiments and are not necessarily indicative of the serialization of the operations being performed. In various embodiments, the processing steps described in FIGS. 6-7 may be performed in varying order, and one or more depicted steps may be performed in parallel with other steps. Additionally, execution of some processing steps of FIGS. 6-7 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of improving the performance of frequently executed queries in a database system, comprising:
   receiving, by the database system, a first query to be executed;
   generating a plurality of query plans including a first query plan and a second query plan;
   evaluating a first cost value of the first query plan and a second cost value of the second query plan that respectively specify an estimated processing cost for execution of the first query plan and the second query plan;
   evaluating the second query plan as potentially having a lower execution cost than the first query plan if an index was generated for utilization of the second query plan;
   saving the second cost value and an index cost value that specifies an estimated cost for generating the index;
   determining a parametric value corresponding to an estimated break-even point at which cost of execution of the second query plan and creation of the index would not exceed the first cost value of executing the first query plan, wherein the break-even point occurs when a cumulative query savings outweighs the estimated cost of having to generate the index;
   determining at least partly based on the estimated break-even point and a number of times the first query has or is likely to be executed, whether to create the index to the execute the second query plan utilizing the index, instead of executing the first query plan; and
   creating the index and executing the second query plan utilizing the index when determined at least partly based on the estimated break-even point that is more efficient to create the index to the execute the second query plan utilizing the index, instead of executing the first query plan.

2. The method of claim 1, further comprising: receiving a second query compliant with the first query; executing the first query plan that is cached.

3. The method of claim 2, further comprising: determining that the index flag is set in the affirmative.

4. The method of claim 3, further comprising:
   generating the index; and
   deleting the first query plan from the cache.

5. The method of claim 4, further comprising:
   receiving a third query compliant with the first query;
   generating an instance of the first query plan and the second query plan;
   determining that the second query plan is more efficiently executed than the first query plan; and
   executing the second query plan, wherein execution of the second query plan utilizes the index.

6. The method of claim 5, further comprising caching the second query plan.

7. A non-transitory computer-readable medium including computer-executable instructions for execution by a processing system, the computer-executable instructions for improving the performance of frequently executed queries in a database system, wherein the computer-executable instructions, when executed, cause the processing system to:
   receive, by the database system, a first query to be executed; generate a plurality of query plans including a first query plan and a second query plan;
   evaluate a first cost value of the first query plan and a second cost value of the second query plan that respectively specify an estimated processing cost for execution of the first query plan and the second query plan;
   evaluate the second query plan as potentially having a lower execution cost than the first query plan if an index was generated for utilization of the second query plan;
   save the second cost value and an index cost value that specifies an estimated cost for generating the index;
   determine a parametric value corresponding to an estimated break-even point at which cost of execution of the second query plan and creation of the index would not exceed the first cost value of executing the first query plan, wherein the break-even point occurs when a cumulative query savings outweighs the estimated cost of having to generate the index;
   determine at least partly based on the estimated break-even point and a number of times the first query has or is likely to be executed, whether to create the index to the execute the second query plan utilizing the index, instead of executing the first query plan; and
   create the index and executing the second query plan utilizing the index when determined at least partly based on the estimated break-even point that is more efficient to create the index to the execute the second query plan utilizing the index, instead of executing the first query plan.

8. The non-transitory computer-readable medium of claim 7, further comprising instructions that, when executed by the processing system, cause the processing system to: receive a second query compliant with the first query; and execute the first query plan that is cached.

9. The non-transitory computer-readable medium of claim 8, further comprising instructions that, when executed by the processing system, cause the processing system to: determine that the index flag is set in the affirmative.

10. The non-transitory computer-readable medium of claim 9, further comprising instructions that, when executed by the processing system, cause the processing system to:
    generate the index; and
    delete the first query plan from the cache.

11. The non-transitory computer-readable medium of claim 10, further comprising instructions that, when executed by the processing system, cause the processing system to:
    receive a third query compliant with the first query;
    generate an instance of the first query plan and the second query plan;
    determine that the second query plan is more efficiently executed than the first query plan; and
    execute the second query plan, wherein execution of the second query plan utilizes the index.

12. The non-transitory computer-readable medium of claim 11, further comprising instructions that, when executed by the processing system, cause the processing system to cache the second query plan.

13. A device that includes a memory and one or more processors operable to:
    receive a first query to be executed;
    generate a plurality of query plans including a first query plan and a second query plan;

evaluate a first cost value of the first query plan and a second cost value of the second query plan that respectively specify an estimated processing cost for execution of the first query plan and the second query plan;

evaluate the second query plan as potentially having a lower execution cost than the first query plan if an index was generated for utilization of the second query plan;

save the second cost value and an index cost value that specifies an estimated cost for generating the index;

determine a parametric value corresponding to an estimated break-even point at which cost of execution of the second query plan and creation of the index would not exceed the first cost value of executing the first query plan, wherein the break-even point occurs when a cumulative query savings outweighs the estimated cost of having to generate the index;

determine, at least partly based on the estimated break-even point and a number of times the first query has or is likely to be executed, whether to create the index to the execute the second query plan utilizing the index, instead of executing the first query plan; and create the index and executing the second query plan utilizing the index when determined at least partly based on the estimated break-even point that is more efficient to create the index to the execute the second query plan utilizing the index, instead of executing the first query plan.

14. The device of claim 13, wherein the one or more processors are further operable to: receive a second query compliant with the first query, and execute the first query plan that is cached.

15. The device of claim 14, wherein the one or more processors are further operable to: determine that the index flag is set in the affirmative.

16. The device of claim 15, wherein the one or more processors are further operable to generate the index, and delete the first query plan from the cache.

17. The device of claim 16, wherein the one or more processors are further operable to: receive a third query compliant with the first query,
generate an instance of the first query plan and the second query plan,
determine that the second query plan is more efficiently executed than the first query plan, and
execute the second query plan, wherein execution of the second query plan utilizes the index.

18. The device of claim 17, wherein the one or more processors are further operable to cache the second query plan.

* * * * *